(12) United States Patent
Nakayama et al.

(10) Patent No.: US 7,950,164 B2
(45) Date of Patent: May 31, 2011

(54) SURFACE TEXTURE MEASUREMENT APPARATUS AND ROUNDNESS MEASURING APPARATUS

(75) Inventors: Tatsuki Nakayama, Kure (JP); Hideki Shindo, Kure (JP)

(73) Assignee: Mitutoyo Corporation, Kawsaki-shi (JP)

( * ) Notice: Subject to any disclaimer, the term of this patent is extended or adjusted under 35 U.S.C. 154(b) by 0 days.

(21) Appl. No.: 12/831,678

(22) Filed: Jul. 7, 2010

(65) Prior Publication Data

US 2011/0005095 A1 Jan. 13, 2011

(30) Foreign Application Priority Data

Jul. 8, 2009 (JP) .................................. 2009-161442

(51) Int. Cl.
*G01B 5/20* (2006.01)
*G01B 5/00* (2006.01)
(52) U.S. Cl. .......................................... 33/556; 33/559
(58) Field of Classification Search ...................... 33/556, 33/558, 559, 549, 551, 553, 561.1, 1 M
See application file for complete search history.

(56) References Cited

FOREIGN PATENT DOCUMENTS

| JP | 6-300505 | 10/1994 |
|---|---|---|
| JP | 2007-071726 | 3/2007 |

*Primary Examiner* — Yaritza Guadalupe-McCall
(74) *Attorney, Agent, or Firm* — Rankin, Hill & Clark LLP

(57) ABSTRACT

A roundness measuring apparatus includes: a stylus having a contact part; a holding member that holds the stylus while allowing displacement of the contact part; an elastic member that presses the contact part against a measurement target object; a detector holder that supports the holding member rotatably; a motor; an elastic force adjustment member that is rotatable and concentric with the holding member; a joining section that joins the elastic force adjustment member with the holding member to maintain relative rotational positions; and a restricting section that restricts rotation of the elastic force adjustment member at a predetermined rotational position. The displacement direction of the contact part is adjusted in a first rotation range. The rotational position of the holding member relative to the rotational position of the elastic force adjustment member changes with the rotation of the elastic force adjustment member being restricted in a second rotation range.

7 Claims, 6 Drawing Sheets

US 7,950,164 B2

SURFACE TEXTURE MEASUREMENT APPARATUS AND ROUNDNESS MEASURING APPARATUS

BACKGROUND OF THE INVENTION

1. Field of the Invention

The present invention relates to a surface texture measurement apparatus that measures the texture of a measurement target surface on the basis of the displacement of the contact part of a stylus. The displacement is detected in a state in which the contact part of the stylus is in contact with the measurement target surface. In addition, the invention relates to a roundness measuring apparatus.

2. Description of the Related Art

A roundness measuring apparatus that is used for acquiring various kinds of data related to the roundness of a measurement target object such as a cylindrical column, a circular cylinder, or the like is known well. The roundness data includes, for example, data regarding circularity, concentricity, and coaxiality. A roundness measuring apparatus measures and calculates the roundness of a measurement target object as follows. A measurement target object, which is an object to be measured, is placed on a turntable. The surface position of the measurement target object is detected by means of a contact type stylus while the turntable is rotated. Data regarding the surface position of the measurement target object being rotated thereon is acquired for measuring and calculating the roundness of the measurement target object (refer to Japanese Unexamined Patent Application Publication Nos. 2007-71726 and H6-300505).

Especially when a measurement target surface is soft, an excessive pressing force of a stylus that is applied onto the measurement target surface will have adverse effects on the result of measurement. For example, measurement values could vary widely. As a conventional solution for avoiding the above influence, an apparatus for measuring surface texture such as a roundness measuring apparatus that is provided with a measuring force adjustment mechanism is used. The measuring force adjustment mechanism is capable of adjusting the measuring force of a detector depending on the material of a measurement target object or the like. FIG. 6 is a diagram that schematically illustrates an example of the structure of a measuring force adjustment mechanism of a roundness measuring apparatus according to related art. As illustrated in FIG. 6, a wire spring 160 is used as a component of the measuring force adjustment mechanism. One end of the wire spring 160 is connected to a sliding switch 190. The other end of the wire spring 160 is connected to the base end of a stylus 140. When a user moves the sliding switch 190 manually, the degree of bending of the wire spring 160 changes. By this means, the user can adjust the measuring force of the stylus 140 manually.

However, to change a measuring force by means of such a conventional measuring force adjustment mechanism, a user has to manually operate a sliding switch as explained above. When the user desires to change a measuring force during measurement, it is necessary to temporarily suspend a measurement program, manually change the measuring force, and thereafter restart the measurement program. To motorize a structure for changing the degree of bending of a wire spring, it is necessary to provide a dedicated driver, a controlling scale, and the like as additional components. These dedicated driver and controlling scale that are added to an existing detector will increase the size of the detector. In addition, such a structure is disadvantageous in terms of cost.

SUMMARY OF THE INVENTION

An advantage of some aspects of the invention is to provide a surface texture measurement apparatus that is equipped with a small inexpensive detector and that makes it possible to carry out uninterrupted measurement by changing the measuring force of the detector without any need to suspend a measurement program. In addition, a roundness measuring apparatus is provided.

To overcome the above disadvantages without any limitation thereto, the invention provides, as an aspect thereof, a surface texture measurement apparatus for measuring texture of a measurement target surface of a measurement target object by detecting displacement of a contact part that occurs with the contact part being in contact with the measurement target surface. A surface texture measurement apparatus according to an aspect of the invention includes: a table on which the measurement target object is placed; a stylus that has the contact part at the tip of the stylus, the contact part being brought into contact with the measurement target object; a holding member that holds the stylus while allowing the stylus to move, the holding member allowing the displacement of the contact part as the stylus moves in contact with the measurement target object; an elastic member that applies a force for pressing the contact part against the measurement target object due to elasticity in a state in which the contact part is in contact with the measurement target object; a detector holder that can move over, toward, and/or away from the table and supports the holding member rotatably so as to turn a displacement direction of the contact part; a rotary motor that is supported on the detector holder and drives the holding member, which is coupled to the rotary motor, to rotate; an elastic force adjustment member that is provided as a rotatable member that is concentric with the holding member; a joining section that joins the elastic force adjustment member with the holding member to maintain rotational positions relative to each other; and a restricting section that restricts rotation of the elastic force adjustment member at a predetermined rotational position, wherein the range of the rotational position of the holding member driven by the rotary motor includes a first rotation range and a second rotation range, which is different from the first rotation range, the first rotation range is a range in which the displacement direction of the contact part is adjusted in a state in which the joining section maintains the rotational position of the holding member relative to the rotational position of the elastic force adjustment member, the second rotation range is a range in which the rotational position of the holding member relative to the rotational position of the elastic force adjustment member changes because the restricting section restricts the rotation of the elastic force adjustment member, and the elastic force adjustment member increases or decreases amount of elastic deformation of the elastic member according to the rotational position of the elastic force adjustment member relative to the rotational position of the holding member.

In the above paragraph, a holding member (that) holds the stylus "while allowing the stylus to move" encompasses the following meaning; the stylus can move linearly and/or turn (inclination movement). In the above paragraph, "an elastic member (that) applies a force for pressing the contact part against the measurement target object due to elasticity in a state in which the contact part is in contact with the measurement target object" encompasses the following meaning; the elastic member may apply a direct pressing force to the contact part; alternatively, the elastic member may apply an elastic force to the stylus to press the contact part indirectly. The elastic member is made of a material that can be deformed elastically. The elastic material includes, but is not limited to, spring, rubber, and resin. Any member, material, or the like that satisfies the following conditions can be adopted as the elastic member; it is provided between the stylus and the elastic force adjustment member the amount of elastic deformation is increased/decreased depending on a positional relation between them; and it applies a force to the stylus or the contact part due to elasticity.

In a surface texture measurement apparatus according to the above aspect of the invention, it is preferable that the joining section should ensure contact between the holding member and the elastic force adjustment member to maintain the elastic deformation by means of a frictional force that acts therebetween due to the contact and joins the holding member with the elastic force adjustment member by means of the frictional force; the restricting section should be a restricting member that is fixed to the detector holder; a contact member that is provided on the elastic force adjustment member should be brought into contact with the restricting member; the restricting member should restrict rotation when in contact with the contact member; the rotary motor should drive the holding member together with the elastic force adjustment member to rotate in the first rotation range by means of the frictional force; and the rotary motor should cause the holding member and the elastic force adjustment member to rotate to predetermined rotational positions so as to bring the contact member into contact with the restricting member and cause the holding member alone to rotate as driven by power that is not less than a certain magnitude of the frictional force in the second rotation range so as to move the rotational position of the elastic force adjustment member relative to the rotational position of the holding member.

In the above surface texture measurement apparatus having the preferred configuration, it is further preferable that, after changing the rotational position of the elastic force adjustment member relative to the rotational position of the holding member in the second rotation range, the rotary motor should cause the holding member to rotate in the opposite direction so that the contact member moves away from the restricting member and further cause the holding member to rotate together with the elastic force adjustment member in the opposite direction so that the displacement direction of the contact part is set to a predetermined orientation in the first rotation range.

In the above surface texture measurement apparatus having the preferred configuration, it is further preferable that the second rotation range should be divided into a normal-direction-side rotation range that continues from the first rotation range in the direction of normal rotation and a reverse-direction-side rotation range that continues from the first rotation range in the direction of reverse rotation; the rotary motor should cause the holding member alone to rotate in the normal direction in a state in which rotation of the elastic force adjustment member in the direction of normal rotation is restricted so as to increase the amount of elastic deformation in the normal-direction-side rotation range; and the rotary motor should cause the holding member alone to rotate in the reverse direction in a state in which rotation of the elastic force adjustment member in the direction of reverse rotation is restricted so as to decrease the amount of elastic deformation in the reverse-direction-side rotation range.

In a surface texture measurement apparatus according to the above aspect of the invention, it is preferable that the stylus should be a lever stylus that can pivot on a fulcrum. In a surface texture measurement apparatus according to the above aspect of the invention, it is preferable that the elastic member be a wire spring having one end that is connected to the elastic force adjustment member and the other end that is connected to the stylus; and the amount of elastic deformation that is increased or decreased by the elastic force adjustment member should be a bend amount of the wire spring.

A roundness measuring apparatus according to an aspect of the invention includes: the surface texture measurement apparatus according to the above aspect of the invention; and a turntable on which the measurement target object is placed, wherein roundness of the measurement target object that has a substantially circular shape in cross section is measured on the basis of the amount of displacement of the contact part.

The range of the rotational position of the holding member driven by the rotary motor is divided into the first rotation range in which the displacement direction of the contact part is turned and the second rotation range in which the elastic force of the elastic member is adjusted. Therefore, it is possible to change a pressing force acting against the measurement target surface in a state in which the contact part is in contact with the measurement target object, that is, a measuring force, by means of the rotary motor. Since it is not necessary to suspend a measurement program for the purpose of changing the measuring force, it is possible to carry out continuous measurement without any interruption. In addition, a conventional rotary motor of a detector (the stylus, the holding member, and the elastic member) is used also as a mechanism for adjusting a measuring force. Therefore, it is not necessary to provide a driver, a controlling scale, and the like for changing a measuring force automatically as additional components inside the detector. Therefore, it is possible to avoid an increase in the size of the detector. In addition, such a structure is advantageous in terms of cost. As explained above, a surface texture measurement apparatus and a roundness measuring apparatus according to aspects of the invention make it possible to carry out uninterrupted measurement by changing the measuring force of a detector without any need to suspend a measurement program. In addition, it is possible to use a small inexpensive detector.

DESCRIPTION OF THE PREFERRED EMBODIMENTS

Figure 1:
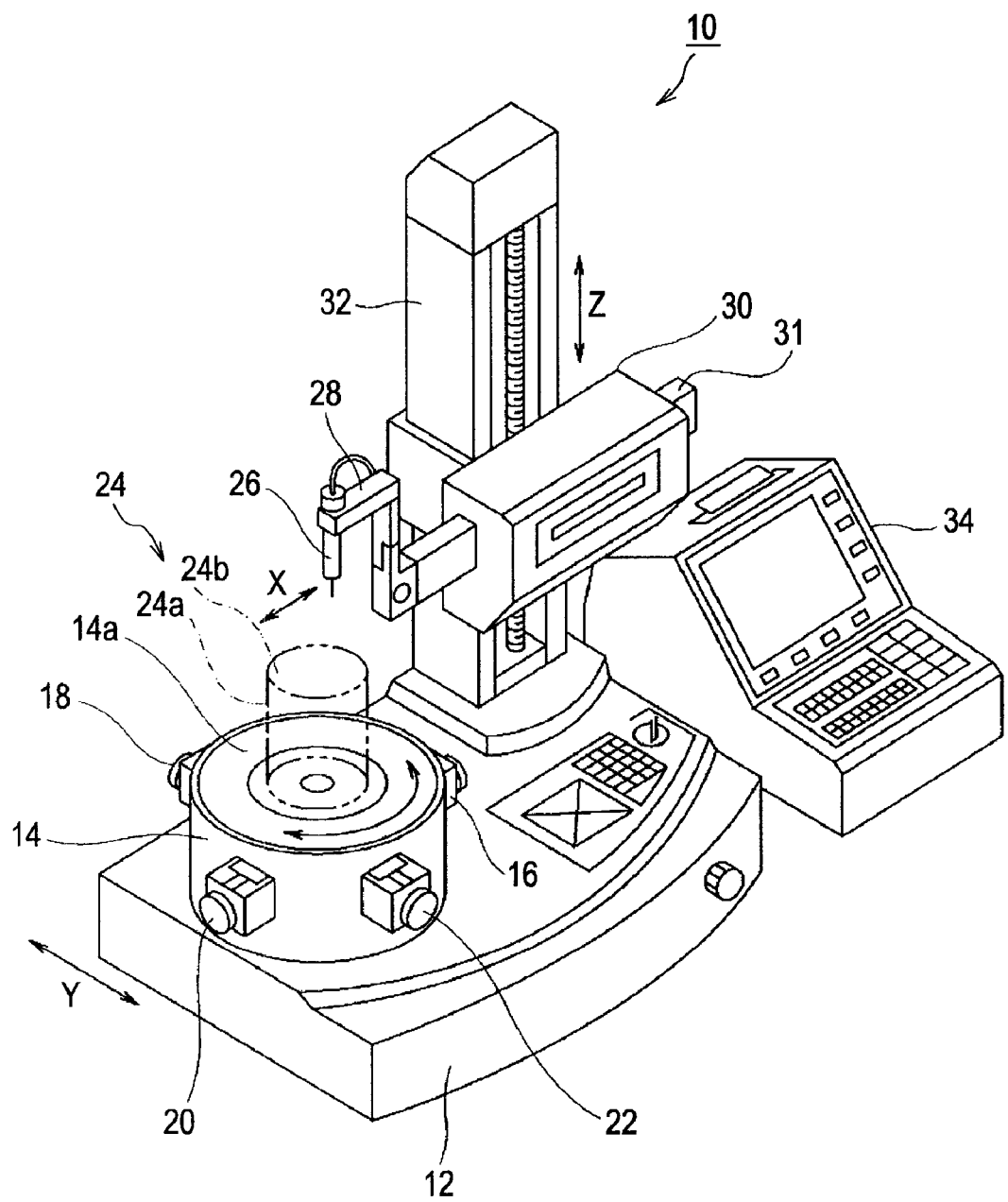
FIG. 1 is a diagram that schematically illustrates an example of the appearance of a roundness measuring apparatus according to an exemplary embodiment of the invention.

With reference to the accompanying drawings, a preferred embodiment of the present invention will now be explained in detail. FIG. 1 is a diagram that schematically illustrates an example of the appearance of a roundness measuring apparatus 10 according to an exemplary embodiment of the invention. The illustrated roundness measuring apparatus 10 includes a base 12, a turntable 14 that is provided on the base 12 as a rotatable table, an X position adjusting means 16 for adjusting the X-direction position of the turntable 14, a Y position adjusting means 18 for adjusting the Y-direction position of the turntable 14, an X inclination adjusting means 20 for adjusting the X-direction inclination of a surface (14a) of the turntable 14 on which a measurement target object 24 is placed, a Y inclination adjusting means 22 for adjusting the Y-direction inclination of the object placement surface 14a of the turntable 14, a detector 26 that can be brought into contact with a surface of the measurement target object 24 that is placed on the turntable 14 to detect the surface position of the measurement target object 24, a detector holder 28 that holds the detector 26, an X-axis moving means 30 that can move the detector 26 in the X direction together with the detector holder 28, and a Z-axis moving means 32 that can move the X-axis moving means 30 in the Z direction (i.e., upward and downward).

Information on the amount of rotation of the turntable 14, the amount of movement of the placement surface 14a on an X-Y plane, the amount of inclination of the placement surface 14a with respect to the X-Y plane, the amount of movement of the detector 26 by the X-axis moving means 30 and the Z-axis moving means 32, and the amount of displacement in the inclination angle (i.e., angular displacement) of a stylus that is provided as a component of the detector 26 is sent to a control unit 34. A microcomputer is built in the control unit 34.

Figure 2:
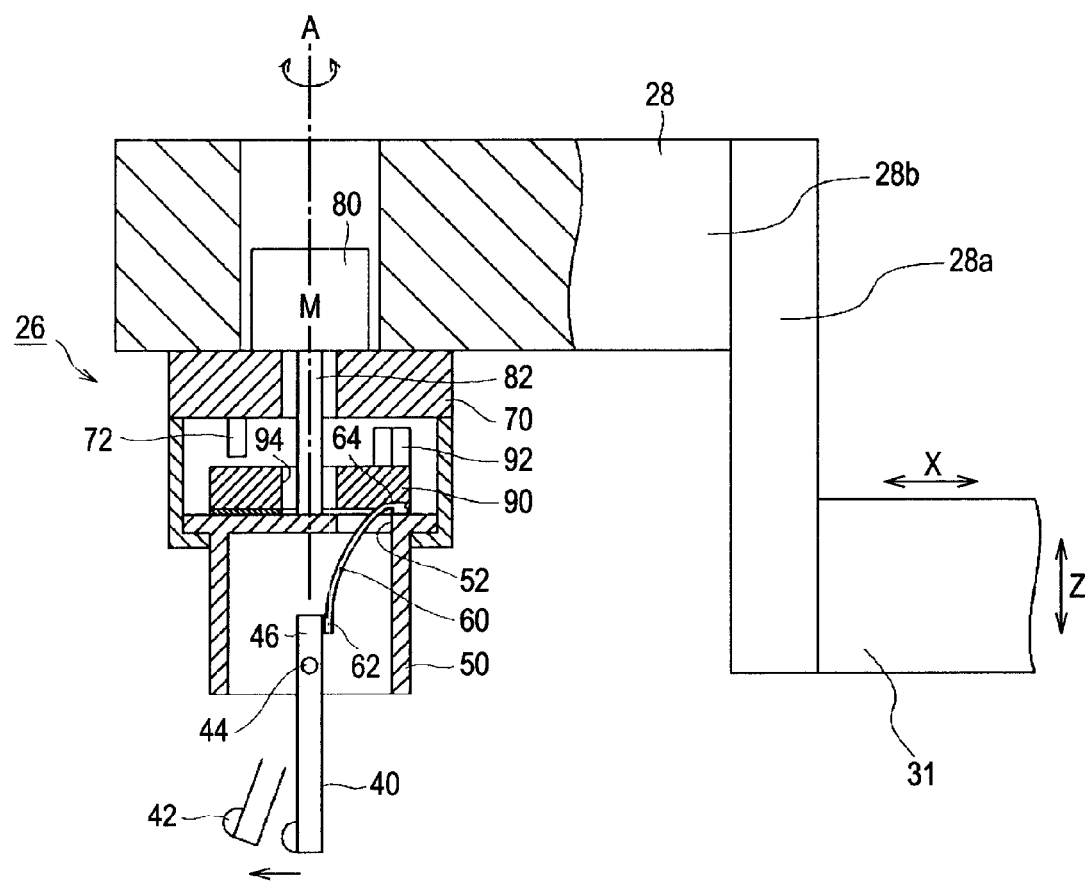
FIG. 2 is a side sectional view that schematically illustrates an example of the inner configuration of a detector used in a roundness measuring apparatus illustrated in FIG. 1.

As illustrated in FIGS. 1 and 2, the detector 26 is provided on the detector holder 28. The X-axis moving means 30 and the Z-axis moving means 32 (refer to FIG. 1) can move the detector 26 together with the detector holder 28 in the X and Z directions toward and away from the measurement target object 24 that is placed on the turntable 14. The main components of the detector 26 illustrated in FIG. 2 are a contact type stylus 40, a stylus-holding member 50, a wire spring (elastic member) 60, an attachment member 70, a motor 80, and an elastic force adjustment member 90. The attachment member 70 is provided for attaching an entire detector body to the detector holder 28. The motor 80 supplies power for rotating the detector 26. The elastic force adjustment member 90, which has the shape of a disc, is provided as an inner component.

A lever mechanism is adopted for the stylus 40. Accordingly, the stylus 40 can pivot on a fulcrum 44. The contact part 42 of the stylus 40 that is formed at the tip thereof can be brought into contact with the measurement target object 24. The base end 46 of the stylus 40 is in contact with the wire spring 60. A stylus displacement detecting means (not illustrated) detects a change in the inclination position (i.e., tilt angle) of the stylus 40 that occurs in accordance with the surface profile of the measurement target object 24 with which the stylus 40 is in contact.

Figure 3:
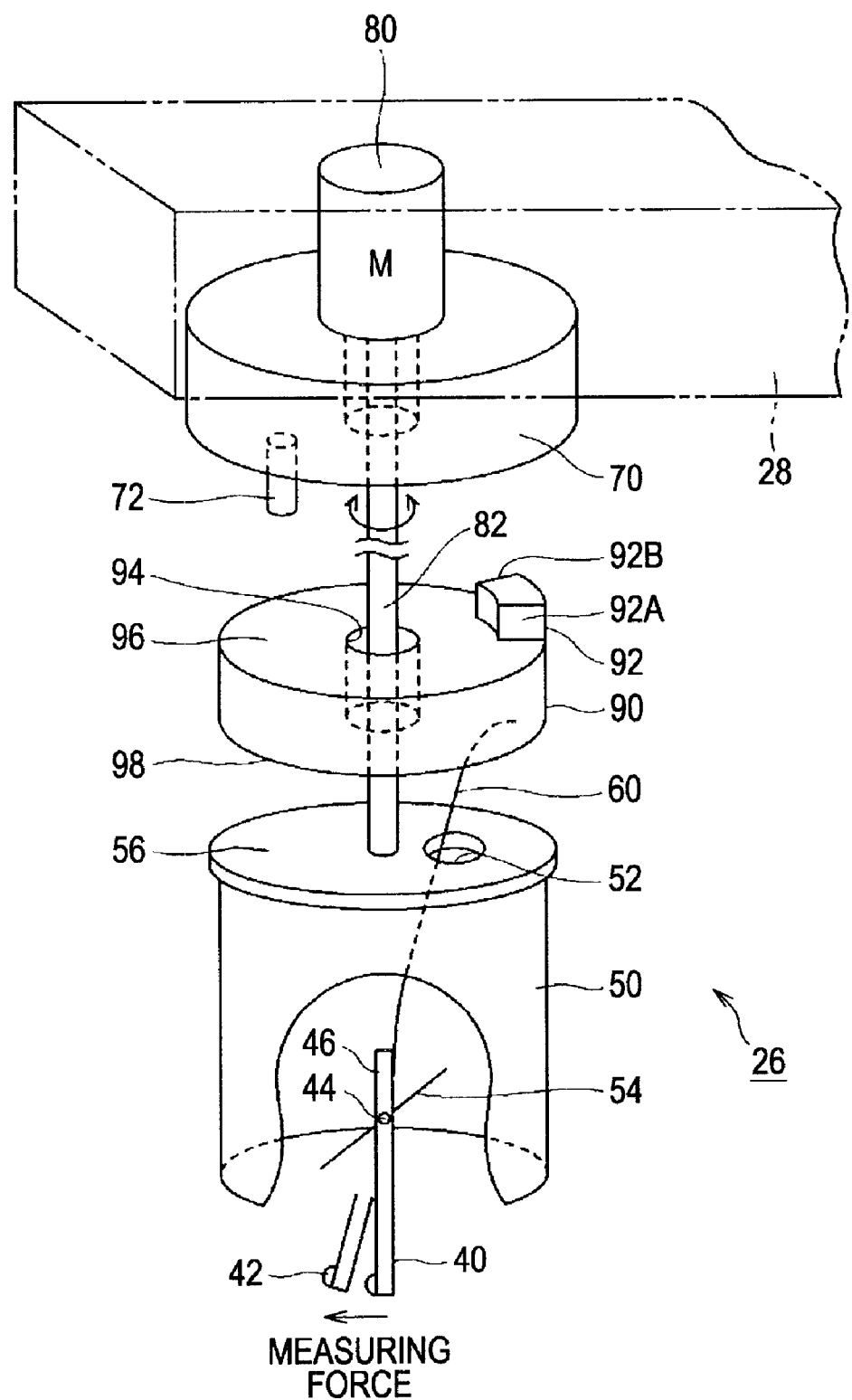
FIG. 3 is an exploded perspective view that schematically illustrates an example of the inner configuration of the detector used in a roundness measuring apparatus illustrated in FIG. 1.

As illustrated in FIG. 3, which is an exploded perspective view of the detector 26, the holding member 50 has a substantially cylindrical shape. A shaft 54 for supporting the stylus 40 is provided inside the holding member 50. The supporting shaft 54 supports the stylus 40 while allowing the stylus 40 to move in a turning direction. The stylus 40 protrudes through the open end of the cylindrical holding member 50 in the Z direction. When the detector holder 28 is moved in the X direction to bring the stylus 40 into contact with the measurement target object 24, the stylus 40 turns, causing a minute displacement of the contact part 42. One end 64 of the wire spring 60 is connected to the elastic force adjustment member 90, which will be explained later. The other end 62 of the wire spring 60 is connected to the base end 46 of the stylus 40. The holding member 50 has an opening 52 through which the wire spring 60 is inserted. The wire spring 60 extends from the inside of the holding member 50 to the outside thereof or vice versa. The wire spring 60 is deformed with a predetermined degree of bending. The elastic force adjustment member 90 and the stylus 40 are connected to each other by means of the wire spring 60.

The contact part 42 of the stylus 40 is not in contact with the measurement target object 24 when measurement is not being carried out. Therefore, since no external force is exerted on the tip part of the stylus 40 during a period of non-measurement, the stylus 40 is urged to have a maximum angle of inclination due to elasticity of the wire spring 60. When the contact part 42 is brought into contact with the measurement target object 24 in the course of measurement, the wire spring 60 applies a force for pressing the contact part 42 against the measurement target object 24 due to an elastic force that depends on its degree of bending. A measuring force of the detector 26 is generated in this way. The wire spring 60 keeps the contact part 42 in contact with the measurement target object 24 when roundness measurement or the like is being carried out. Therefore, it is possible for the contact part 42 to follow the surface undulation of the measurement target object 24. To maintain a contact state, measurement is started in a state in which the contact part 42 is pressed against a measurement target surface until the stylus 40 is tilted with a predetermined angle.

The attachment member 70 supports the holding member 50 such that the holding member 50 can rotate around an axis A together with the stylus 40 as a combined member in order to turn the displacement direction of the contact part 42 (hereinafter may be referred to as "the measurement direction of the detector 26"). The rotary motor 80, which is fixed to the attachment member 70, has an output shaft 82 that is inserted through the attachment member 70. With its output shaft 82 being connected to the holding member 50, the rotary motor 80 causes the holding member 50 to rotate around the axis A. Having the above structure, the rotary motor 80 is driven to rotate the holding member 50 to change its rotational position into a given position in a predetermined range of rotation. As the rotational position of the holding member 50 is set to the given position, the measurement direction of the detector 26 is set to predetermined orientation. The measurement direction is set to optimum orientation depending on conditions such as the shape of a measurement target surface and the position thereof. For example, the measurement direction is optimized to carry out measurement on an inner circumferential surface of a concave as the measurement target surface. Information on the shape of the measurement target object 24 is pre-written in a measurement program. The control unit 34 determines the optimum measurement direction depending thereon. After the setting of the measurement direction, the detector holder 28 is moved to bring the contact part 42 into contact with a measurement target surface, which causes a change in the angle of inclination of the stylus 40. The angular change causes minute displacement of the contact part 42 in the displacement direction thereof. The angle of inclination of the stylus 40 (the amount of displacement of the contact part 42) is detected. The roundness of the measurement target object 24 that has a substantially circular shape in cross section is measured on the basis of the detected value.

A feature of the present embodiment of the invention lies in that the detector 26 includes the elastic force adjustment member 90 for adjusting the elastic force of the wire spring 60. The elastic force adjustment member 90 is provided for increasing and decreasing the amount of elastic deformation of the wire spring 60 by utilizing electro motive power. The elastic force adjustment member 90 is provided for changing the degree of bending of the wire spring 60 by utilizing rotation power supplied by the motor 80. The elastic force adjustment member 90 is rotatably supported on the holding member 50. The elastic force adjustment member 90 has the shape of a substantially circular plate having a through hole 94 at its center. The elastic force adjustment member 90 is provided as a member that is concentric with the holding member 50 and is able to rotate around the axis A. The output shaft 82 of the rotary motor 80 is inserted through the through hole 94. The rotation power of the motor 80 is not directly applied to the elastic force adjustment member 90. That is, the lower surface (stylus-side surface) 98 of the circular plate is in contact with the upper surface 56 of the holding member 50. A frictional force acts between the contact surface of the elastic force adjustment member 90 and the contact surface of the holding member 50. The rotation power of the motor 80 that is applied to the holding member 50 is transmitted indirectly to the elastic force adjustment member 90 because of the frictional force, which causes the elastic force adjustment member 90 to rotate. As explained above, since a frictional force that has a certain magnitude or greater acts, the elastic force adjustment member 90 is joined to the holding member 50 without being fixed thereto. The detector 26 includes a joining means for joining the elastic force adjustment member 90 with the holding member 50 to maintain the rotational positions thereof relative to each other. As an example of the joining means, a flat spring (not illustrated) that presses the elastic force adjustment member 90 against the holding member 50 with a predetermined force can be used. Alternatively, a structure in which the elastic force adjustment member 90 is cramped between the attachment member 70 and the holding member 50 with a predetermined pressing force may be adopted as the joining means. As explained above, the joining means joins the elastic force adjustment member 90 with the holding member 50 by means of a frictional force that acts between the contact surface of the elastic force adjustment member 90 and the contact surface of the holding member 50 and has a certain magnitude or greater. The contact surfaces of the elastic force adjustment member 90 and the holding member 50 may be treated so that a frictional force that has a certain magnitude or greater should act easily. The contact surfaces may be covered with rubber sheets for greater friction. In addition, the elastic force adjustment member 90 maintains the elastic deformation of the wire spring 60 by using the frictional force acting between the elastic force adjustment member 90 and the holding member 50.

The elastic force adjustment member 90 has a protrusion 92 on its upper surface 96 opposite to the contact surface mentioned above. The protrusion 92 is an example of a contact member ("contacted" member) according to an aspect of the invention. The rotational position of the protrusion 92 around the axis A changes as the elastic force adjustment member 90 rotates. A stopper pin 72 is provided on the attachment member 70. The stopper pin 72 protrudes toward the upper surface 96 of the elastic force adjustment member 90. The stopper pin 72 is an example of a restricting member (a restricting section/means) according to an aspect of the invention. The stopper pin 72 is fixed at a position where, when the elastic force adjustment member 90 is rotated to a predetermined rotational position, the protrusion 92 of the elastic force adjustment member 90 is brought into contact with the stopper pin 72, which is the other counterpart contact member. Herein, the direction in which the elastic force adjustment member 90 rotates around the axis A clockwise as viewed from the motor 80 is defined as the direction of normal rotation. The protrusion 92 has a normal-direction-side contact surface ("contacted" surface) 92A and a reverse-direction-side contact surface 92B. The normal-direction-side contact surface 92A is a sidewall part of the protrusion 92 that is brought into contact with the stopper pin 72 when the elastic force adjustment member 90 is rotated in the normal direction. The reverse-direction-side contact surface 92B is a sidewall part of the protrusion 92 that is brought into contact with the stopper pin 72 when the elastic force adjustment member 90 is rotated in the reverse direction.

The rotary motor 80 can supply power that is not less than the certain magnitude of the aforementioned frictional force to cause the holding member 50 to rotate as driven by such power. When the rotary motor 80 drives the holding member 50 together with the elastic force adjustment member 90 to rotate either in the normal direction or in the reverse direction, the protrusion 92 is brought into contact with the stopper pin 72. Since the contact of the protrusion 92 and the stopper pin 72 prevents further rotation of the elastic force adjustment member 90, the holding member 50 alone rotates as driven by the rotary motor 80. The position at which the stopper pin 72 restricts the rotation of the elastic force adjustment member 90 is hereinafter referred to as "rotation restriction position". In a state in which the elastic force adjustment member 90 has reached the rotation restriction position, a relationship between the rotational position of the elastic force adjustment member 90 and the rotational position of the holding member 50 changes as the holding member 50 alone further rotates. Therefore, the amount of elastic deformation of the wire spring 60 increases or decreases.

Besides the elastic force adjustment member 90, another feature of the present embodiment of the invention lies in that the range of a rotational position of the holding member 50 driven by the rotary motor 80 is divided into a first rotation range 84 and a second rotation range 86. Some roundness measuring apparatuses of the related art are equipped with a mechanism for changing the measurement direction of a detector by utilizing electro motive power. As a unique and distinctive feature of the present embodiment of the invention, the detector 26 itself is rotated by the rotary motor 80; in addition, for example, a certain rotation range (70°) that is not used for the rotation of the detector 26 is used for elastic force adjustment out of the entire rotation range (360°) of the rotary motor 80.

Figure 4A:
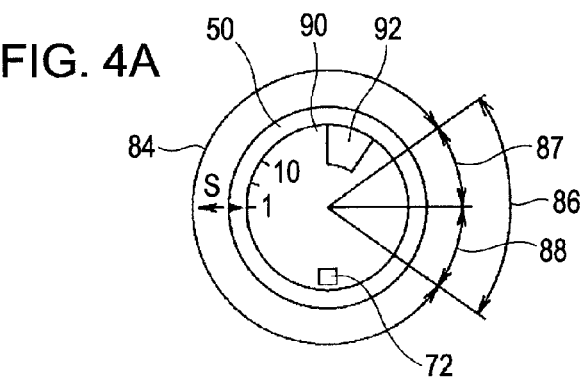
FIGS. 4A to 4G are a set of diagrams that schematically illustrates an example of procedures for changing a measuring force of a roundness measuring apparatus according to an exemplary embodiment of the invention.

As illustrated in FIG. 4A, the rotary motor 80 drives the holding member 50 to rotate in the first rotation range 84, thereby determining a measurement direction S. The adjustable range of the measurement direction S through the rotating operation is limited to an angular range from 0° to 290°. The relative movement operation of the elastic force adjustment member 90 is performed in the second rotation range 86 (an angular range from 290° to 360°), which does not overlap the first rotation range 84 at all. The above angular range is a mere example. It may be set arbitrarily. That is, the rotary motor 80 drives the holding member 50 together with the elastic force adjustment member 90 to rotate in the first rotation range 84 while utilizing a frictional force that is generated by the joining means. The measurement direction S is adjusted in a state in which the relative rotational positions of the elastic force adjustment member 90 and the holding member 50 are maintained. When the elastic force adjustment member 90 accompanying the holding member 50 has now reached the rotation restriction position, the rotary motor 80 causes the holding member 50 alone to rotate as driven by power that is not less than the certain magnitude of the aforementioned frictional force in the second rotation range 86. Accordingly, the rotational position of the elastic force adjustment member 90 relative to the rotational position of the holding member 50 moves as the holding member 50 alone rotates.

As illustrated in FIG. 4A, the second rotation range 86 of the holding member 50 is divided into a normal-direction-side rotation range 87 and a reverse-direction-side rotation range 88. The normal-direction-side rotation range 87 continues from the first rotation range 84 in the direction of normal rotation. The reverse-direction-side rotation range 88 continues from the first rotation range 84 in the direction of reverse rotation. The amount of elastic deformation is increased in the normal-direction-side rotation range 87. The amount of elastic deformation is decreased in the reverse-direction-side rotation range 88.

Figure 4B:
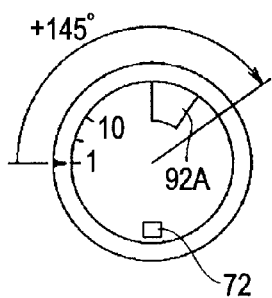

As an example of procedures for increasing the amount of elastic deformation by changing the relative rotational positions of the holding member 50 and the elastic force adjustment member 90, the increasing of the magnitude of a measuring force from the first level (minimum value) to the tenth level (maximum value) is explained with reference to FIGS. 4B to 4E. A scale that indicates the levels is shown in each of the drawings for the purpose of explanation. The magnitude of the measuring force of a stylus shown in FIG. 4B is set at the level 1. When the rotary motor 80 drives the holding member 50 to rotate in the normal direction into the normal-direction-side rotation range 87, the normal-direction-side contact surface 92A is brought into contact with the stopper pin 72 (refer to FIG. 4C). Since the elastic force adjustment member 90 cannot rotate further in the normal direction, the holding member 50 alone rotates in the normal direction as driven by the rotary motor 80. The amount of elastic deformation of the wire spring 60 (elastic member) is increased to the level 10 (refer to FIG. 4D). Thereafter, the rotary motor 80 drives the holding member 50 to rotate in the reverse direction. Accordingly, the protrusion 92 moves away from the stopper pin 72. The holding member 50 rotates together with the elastic force adjustment member 90 in the reverse direction. They are rotated in the reverse direction into the first rotation range 84. In the first rotation range 84, the displacement direction of the contact part 42 (measurement direction S) is set to predetermined orientation (refer to FIG. 4E). By this means, it is possible to carry out measurement with a measuring force of the increased level 10.

Figure 4E:
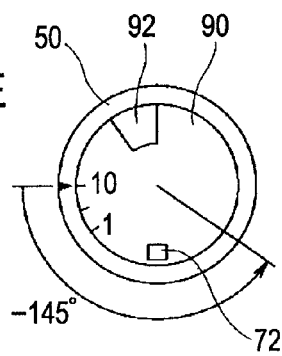
Figure 4C:
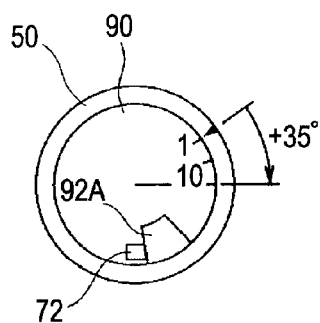
Figure 4F:
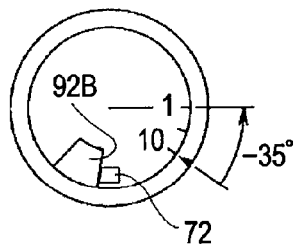
Figure 4D:
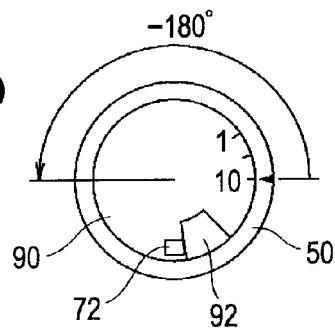
Figure 4G:
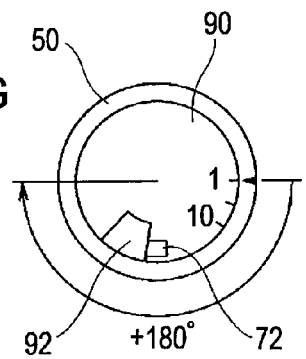

As an example of procedures for decreasing the amount of elastic deformation, the decreasing of the magnitude of a measuring force from the tenth level to the first level is explained with reference to FIGS. 4E to 4G. The magnitude of the measuring force of a stylus shown in FIG. 4E is set at the level 10. When the rotary motor 80 drives the holding member 50 to rotate in the reverse direction into the reverse-direction-side rotation range 88, the reverse-direction-side contact surface 92B is brought into contact with the stopper pin 72 (refer to FIG. 4F). Since the elastic force adjustment member 90 cannot rotate further in the reverse direction, the holding member 50 alone rotates in the reverse direction as driven by the rotary motor 80. The amount of elastic deformation of the wire spring 60 is decreased to the level 1 (refer to FIG. 4G). Thereafter, the rotary motor 80 drives the holding member 50 to rotate in the normal direction. Accordingly, the protrusion 92 moves away from the stopper pin 72. The holding member 50 rotates together with the elastic force adjustment member 90 in the normal direction. They are rotated in the normal direction into the first rotation range 84. In the first rotation range 84, the measurement direction S is set to predetermined orientation (refer to FIG. 4B). By this means, it is possible to carry out measurement with a measuring force of the decreased level 1.

The specifications of a measurement target object that are anticipated as relevant factors in roundness measurement are memorized in the control unit 34 illustrated in FIG. 1 in association with an optimum measuring force for the specifications. For example, the material of a measurement target object, the surface treatment/property thereof (e.g., the material of a surface, the hardness of a surface, and the roughness of a surface), and the like are memorized in the control unit 34. Alternatively, the control unit 34 is configured to be able to acquire information for setting an optimum measuring force for the specifications of the measurement target object 24 from an external device. The above procedures for changing a measuring force are pre-written in a measurement program. The measuring force of a detector is automatically changed when an occasion for changing the measuring force arises in the sequential flow of a measurement program. Therefore, it is possible to carry out roundness measurement continuously without interrupting (i.e., suspending) the measurement program.

It is sometimes necessary to change the orientation of the detector 26 for measurement depending on the shape of a measurement target object. For example, to carry out measurement on the circumferential surface 24a of the measurement target object 24 illustrated in FIG. 1, which has the shape of a substantially cylindrical column, the detector 26 is vertically oriented, that is, takes a vertical position, so that the axis A illustrated in FIG. 2 should be parallel to the Z axis. To carry out measurement on the upper surface 24b of the measurement target object 24, which is perpendicular to the circumferential surface 24a, the detector 26 takes an upper-surface measurement position so that the axis A should be parallel to the Y axis. As explained earlier, the measurement direction of the detector 26 rotates around the axis A as driven by the rotary motor 80. Another motor may be provided besides the rotary motor 80 to change the orientation of the detector 26 depending on a measurement target surface. Since the detector holder 28 illustrated in FIG. 2 includes a vertical member 28a and a horizontal member 28b that are assembled into an L-shaped member, an X-axis slider 31 may support the vertical member 28a such that the vertical member 28a can turn around the shaft of the X-axis slider 31, which extends in the X direction. When the measurement orientation of the detector 26 is changed as explained above, the effects of the deadweight of the stylus 40 on a measurement target surface also change. For example, when the detector 26 takes the upper-surface position for measuring the upper surface 24b, the deadweight of the stylus 40 that acts on the measurement target surface is greater than that acting thereon when the detector 26 takes the vertical position for measuring the circumferential surface 24a. Because of the effects of the deadweight of the stylus 40, if the elastic force of the elastic member were unchanged, an actual measuring force would vary. In the present embodiment of the invention, since an elastic force can be changed when measurement is being carried out, it is possible to keep an actual measuring force at a constant magnitude irrespective of the measurement orientation of a detector even when the measurement orientation is changed. To offer the above advantage, the set values of a measuring force that correspond to the positions of the detector 26 can be pre-written in a measurement program.

As explained above, the roundness measuring apparatus 10 according to the present embodiment of the invention is capable of adjusting the measuring force of the detector 26 by means of the rotary motor 80 of the detector 26 that supplies electro motive power, as illustrated in FIG. 3. Therefore, it is possible to carry out roundness measurement continuously without interrupting a measurement program. The range of rotation is divided into the first rotation range 84 in which the displacement direction of the contact part 42 is turned and the second rotation range 86 in which the elastic force of an elastic member is adjusted. Therefore, it is possible to change a pressing force acting against a measurement target surface in a contact state, that is, a measuring force, by means of the rotary motor 80. Since it is not necessary to suspend a measurement program for the purpose of changing the measuring force, it is possible to carry out continuous measurement without any interruption. In addition, the rotary motor 80, which is a conventional component of the detector 26 (the stylus 40, the holding member 50, and the elastic member 60), is used also as a mechanism for adjusting a measuring force as illustrated in FIG. 3. Therefore, it is not necessary to provide a driver, a controlling scale, and the like for changing a measuring force automatically as additional components inside the detector 26. Therefore, it is possible to avoid an increase in the size of the detector 26. In addition, such a structure is advantageous in terms of cost.

Figure 5A:
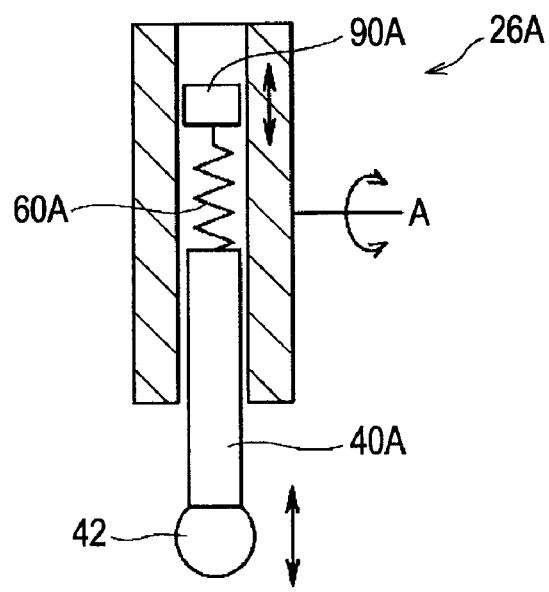
FIGS. 5A and 5B are a set of diagrams that schematically illustrates variation examples of a roundness measuring apparatus according to an exemplary embodiment of the invention.

The measuring apparatus 10 according to the present embodiment of the invention can be applied to various apparatuses that are not limited to a roundness measuring apparatus. For example, it can be applied to a measuring apparatus that has a table on which a measurement target object is placed and a contact type stylus that is moved along a measurement target surface for measurement. Specifically, it can be applied to a surface texture measurement apparatus that measures the texture of a measurement target surface of a measurement target object on the basis of the displacement of the contact part of a stylus, where the displacement is detected in a state in which the contact part of the stylus is in contact with the measurement target surface. Though it is preferable that the stylus of a roundness measuring apparatus should be a lever type stylus, it is not limited thereto. For example, a measuring apparatus may be equipped with a detector 26A illustrated in FIG. 5A. The contact part 42 of a stylus 40A that is formed at the tip thereof is supported in such a manner that the contact part 42 can be displaced in parallel to the direction of the shaft of the stylus 40A. The detector 26A detects the displacement of the contact part 42 in the above direction that occurs when the contact part 42 is in contact with a measurement target surface. A rotary motor causes an elastic force adjustment member 90A to slide in the structure of the detector 26A. As the elastic force adjustment member 90A slides, the elastic force of an elastic member 60A changes, which results in an increase or a decrease in a measuring force. The rotary motor can drive the detector 26A to rotate around the axis A extending in the direction orthogonal to the sliding direction.

Figure 5B:
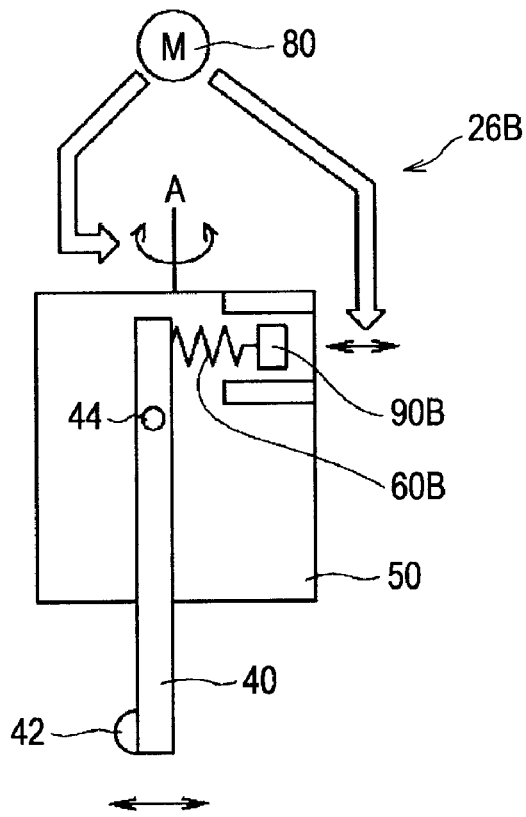
Figure 6:
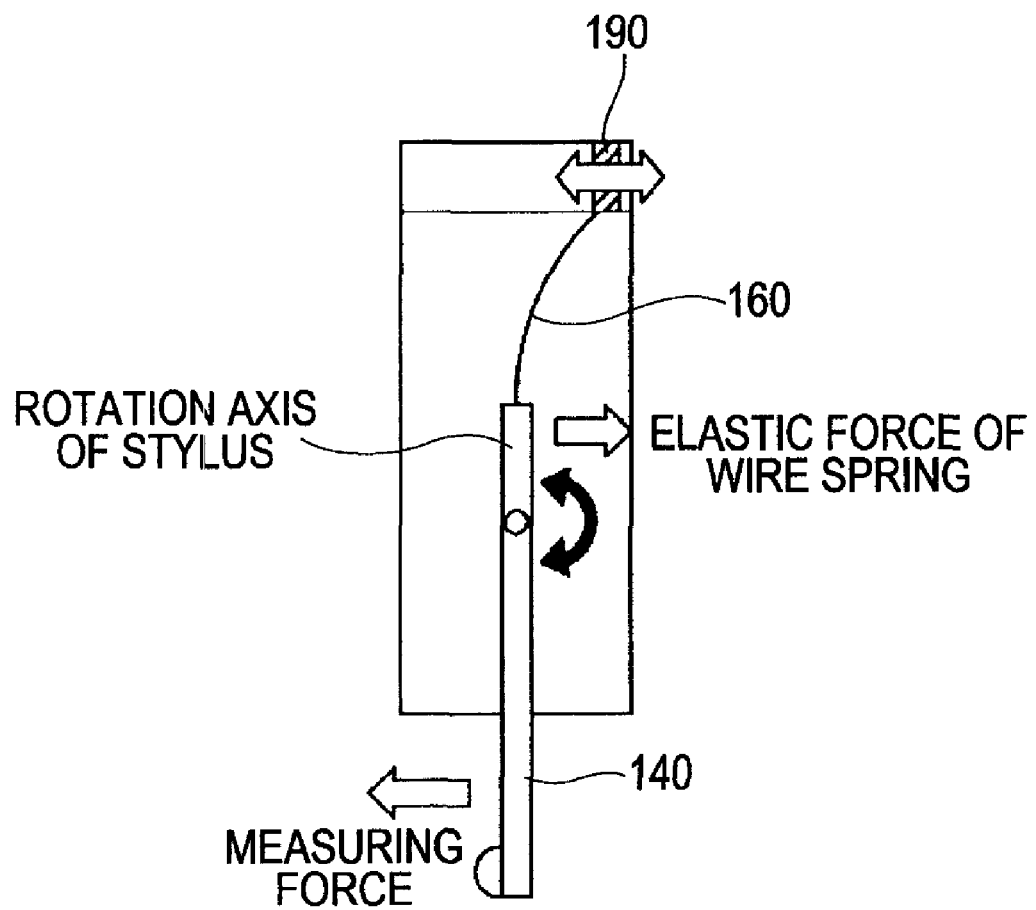
FIG. 6 is a diagram that schematically illustrates an example of the structure of a measuring force adjustment mechanism of a roundness measuring apparatus according to related art.

The scope of the invention is not limited to a mechanism that adjusts an elastic force by rotating an elastic force adjustment member relative to a holding member as explained in the foregoing embodiment. FIG. 5B shows an example of modified structure. The rotation power of the motor 80 is used for the rotational operation of the holding member 50 around the axis A in the first rotation range. The rotation power of the motor 80 is used for the sliding movement of an elastic force adjustment member 90B in the second rotation range. To adjust an elastic force by moving the elastic force adjustment member 90B in a direction other than the rotation direction, for example, in a sliding direction, a mechanism for converting the rotation power of the motor 80 into a driving force for moving the elastic force adjustment member 90B in the sliding direction is necessary. The converting mechanism is not illustrated in the drawing.

In the foregoing embodiment of the invention, a stopper pin is taken as an example of a restricting member. However, a restricting means is not limited to the stopper pin. For example, a mechanism for detecting the movement position of an elastic force adjustment member and locking or unlocking the movement of the elastic force adjustment member automatically when it reaches a predetermined position may be provided as the restricting means. In the foregoing embodiment of the invention, it is explained that the joining means joins an elastic force adjustment member with a holding member by utilizing a frictional force that acts between the contact surface of the elastic force adjustment member and the contact surface of the holding member. However, the scope of the invention is not limited to such an exemplary structure. Other mechanism or the like that joins an elastic force adjustment member with a holding member without using a frictional force may be adopted as the joining means.

What is claimed is:

1. A surface texture measurement apparatus for measuring texture of a measurement target surface of a measurement target object by detecting displacement of a contact part that occurs with the contact part being in contact with the measurement target surface, the surface texture measurement apparatus comprising:
   a table on which the measurement target object is placed;
   a stylus that has the contact part at a tip of the stylus, the contact part being brought into contact with the measurement target object;
   a holding member that holds the stylus while allowing the stylus to move, the holding member allowing the displacement of the contact part as the stylus moves in contact with the measurement target object;
   an elastic member that applies a force for pressing the contact part against the measurement target object due to elasticity in a state in which the contact part is in contact with the measurement target object;
   a detector holder that can move over, toward, and/or away from the table and supports the holding member rotatably so as to turn a displacement direction of the contact part;
   a rotary motor that is supported on the detector holder and drives the holding member, which is coupled to the rotary motor, to rotate;
   an elastic force adjustment member that is provided as a rotatable member that is concentric with the holding member;
   a joining section that loins the elastic force adjustment member with the holding member to maintain rotational positions relative to each other; and
   a restricting section that restricts rotation of the elastic force adjustment member at a predetermined rotational position,
   wherein a range of the rotational position of the holding member driven by the rotary motor includes a first rotation range and a second rotation range, which is different from the first rotation range,
   the first rotation range is a range in which the displacement direction of the contact part is adjusted in a state in which the joining section maintains the rotational position of the holding member relative to the rotational position of the elastic force adjustment member, the second rotation range is a range in which the rotational position of the holding member relative to the rotational position of the elastic force adjustment member changes because the restricting section restricts the rotation of the elastic force adjustment member, and the elastic force adjustment member increases or decreases an amount of elastic deformation of the elastic member according to the rotational position of the elastic force adjustment member relative to the rotational position of the holding member.

2. The surface texture measurement apparatus according to claim 1, wherein the joining section ensures contact between the holding member and the elastic force adjustment member to maintain the elastic deformation by a frictional force that acts therebetween due to the contact and joins the holding member with the elastic force adjustment member by the frictional force;

the restricting section is a restricting member that is fixed to the detector holder;

a contact member that is provided on the elastic force adjustment member and is brought into contact with the restricting member;

the restricting member restricts rotation when in contact with the contact member, the rotary motor drives the holding member together with the elastic force adjustment member to rotate in the first rotation range by the frictional force; and the rotary motor causes the holding member and the elastic force adjustment member to rotate to predetermined rotational positions so as to bring the contact member into contact with the restricting member and causes the holding member alone to rotate as driven by power that is not less than a certain magnitude of the frictional force in the second rotation range so as to move the rotational position of the elastic force adjustment member relative to the rotational position of the holding member.

3. The surface texture measurement apparatus according to claim 2, wherein, after changing the rotational position of the elastic force adjustment member relative to the rotational position of the holding member in the second rotation range, the rotary motor causes the holding member to rotate in the opposite direction so that the contact member moves away from the restricting member and further causes the holding member to rotate together with the elastic force adjustment member in the opposite direction so that the displacement direction of the contact part is set to a predetermined orientation in the first rotation range.

4. The surface texture measurement apparatus according to claim 3, wherein the second rotation range is divided into a normal-direction-side rotation range that continues from the first rotation range in the direction of normal rotation and a reverse-direction-side rotation range that continues from the first rotation range in the direction of reverse rotation;

the rotary motor causes the holding member alone to rotate in the normal direction in a state in which rotation of the elastic force adjustment member in the direction of normal rotation is restricted so as to increase the amount of elastic deformation in the normal-direction-side rotation range; and the rotary motor causes the holding member alone to rotate in the reverse direction in a state in which rotation of the elastic force adjustment member in the direction of reverse rotation is restricted so as to decrease the amount of elastic deformation in the reverse-direction-side rotation range.

5. The surface texture measurement apparatus according to claim 1, wherein the stylus is a lever stylus that can pivot on a fulcrum.

6. The surface texture measurement apparatus according to claim 1, wherein the elastic member is a wire spring having one end that is connected to the elastic force adjustment member and the other end that is connected to the stylus; and the amount of elastic deformation that is increased or decreased by the elastic force adjustment member is bend amount of the wire spring.

7. A roundness measuring apparatus comprising:

the surface texture measurement apparatus according to claim 1; and a turntable on which the measurement target object is placed, wherein roundness of the measurement target object that has a substantially circular shape in cross section is measured on the basis of the amount of displacement of the contact part.

* * * * *